United States Patent
Han

(10) Patent No.: US 11,892,170 B1
(45) Date of Patent: Feb. 6, 2024

(54) STOVE WITH ASH COLLECTING DRAWER

(71) Applicant: Xiajing Han, Ningbo (CN)

(72) Inventor: Xiajing Han, Ningbo (CN)

(*) Notice: Subject to any disclaimer, the term of this patent is extended or adjusted under 35 U.S.C. 154(b) by 0 days.

(21) Appl. No.: 18/174,071

(22) Filed: Feb. 24, 2023

(30) Foreign Application Priority Data

Jan. 19, 2023 (CN) .......................... 202320204960.4

(51) Int. Cl.
| | |
|---|---|
| *F24B 1/00* | (2006.01) |
| *A47J 37/07* | (2006.01) |
| *F24B 13/00* | (2006.01) |
| *F24B 1/191* | (2006.01) |
| *A47J 33/00* | (2006.01) |

(52) U.S. Cl.
CPC ........... *F24B 1/003* (2013.01); *A47J 37/0704* (2013.01); *A47J 37/0763* (2013.01); *A47J 37/0786* (2013.01); *F24B 1/1915* (2013.01); *F24B 13/008* (2013.01); *A47J 33/00* (2013.01); *A47J 2037/0777* (2013.01)

(58) Field of Classification Search
CPC ........ F24B 1/003; F24B 1/1915; F24B 1/022; F24B 1/195; F24B 1/26; F24B 13/008; F24B 13/006; A47J 37/0704; A47J 37/0786; A47J 37/0763; A47J 2037/0777; A47J 33/00
USPC ................. 126/25 R, 29, 9 B, 26, 275 R, 9 R
See application file for complete search history.

(56) References Cited

U.S. PATENT DOCUMENTS

| | | | | |
|---|---|---|---|---|
| 983 A | * | 10/1838 | Mott .................. | A47J 37/0704 126/25 R |
| 501,748 A | * | 7/1893 | Trentowsky .......... | F24B 13/008 209/377 |
| 594,645 A | * | 11/1897 | Nordinger ........... | A47J 37/0704 126/25 R |

(Continued)

FOREIGN PATENT DOCUMENTS

| | | | |
|---|---|---|---|
| DE | 102012011059 A1 | * 12/2013 | |
| EP | 2888978 A1 | * 7/2015 | .......... A47J 37/0704 |

(Continued)

OTHER PUBLICATIONS

"IQSearchDownload—202306072056.pdf", IQ / ProQuest Search, ip.com, Jun. 7, 2023. (Year: 2023).*

*Primary Examiner* — Steven B McAllister
*Assistant Examiner* — Daniel E. Namay

(57) ABSTRACT

A stove with an ash collecting drawer is detachably connected with the base because the stove includes the stove body, the base and the ash collecting drawer. A baking tray is provided on the stove body. The stove body is provided with a first accommodating cavity. The first accommodating cavity is provided with a first accommodating opening. The ash collecting drawer is placed in the first accommodating cavity through the first accommodating opening. The base is provided with a second accommodating cavity. The second accommodating cavity is provided with a second accommodating opening. When the stove body is detached from the base, the stove body is placed in the second accommodating cavity through the second accommodating opening, so that firewood can be burned in the first accommodating cavity, and the ashes generated after combustion fall into the ash collecting drawer.

18 Claims, 4 Drawing Sheets

(56) References Cited

U.S. PATENT DOCUMENTS

| | | | | |
|---|---|---|---|---|
| 738,304 A * | 9/1903 | Faust | | F24B 7/02 |
| | | | | 126/243 |
| 1,011,675 A * | 12/1911 | Tremoulet | | D06F 79/04 |
| | | | | 126/227 |
| 1,181,578 A * | 5/1916 | di Primio | | F24B 1/003 |
| | | | | 126/43 |
| 2,143,602 A * | 1/1939 | Johnson | | F24B 1/20 |
| | | | | 126/14 |
| 2,173,166 A * | 9/1939 | Hoelseher | | F24B 1/202 |
| | | | | 126/25 R |
| 2,413,204 A * | 12/1946 | Wolff | | F24B 1/003 |
| | | | | 99/425 |
| 2,660,997 A * | 12/1953 | Chesser | | F24B 13/008 |
| | | | | 126/15 R |
| 2,722,883 A * | 11/1955 | Rignell | | A47J 37/0704 |
| | | | | 126/25 R |
| 2,833,201 A * | 5/1958 | Simank | | A47J 37/0704 |
| | | | | 99/481 |
| 3,046,969 A * | 7/1962 | Davis | | A47J 37/0704 |
| | | | | 126/25 R |
| 3,094,113 A * | 6/1963 | Avila | | A47J 37/0763 |
| | | | | 126/30 |
| RE26,123 E * | 12/1966 | Davis | | A47J 37/0704 |
| | | | | 126/25 R |
| 3,327,698 A * | 6/1967 | Leslie | | A47J 37/07 |
| | | | | 126/25 R |
| 3,362,394 A * | 1/1968 | Cole | | F24B 13/008 |
| | | | | 126/77 |
| 3,765,397 A * | 10/1973 | Henderson | | F24B 3/00 |
| | | | | 126/25 B |
| 4,638,787 A * | 1/1987 | Tyson | | A47J 37/0704 |
| | | | | 126/25 B |
| 4,706,643 A * | 11/1987 | Tyson | | A47J 37/0704 |
| | | | | 126/41 R |
| 4,909,235 A * | 3/1990 | Boetcker | | A47J 37/0704 |
| | | | | 126/25 C |
| 5,094,223 A * | 3/1992 | Gonzalez | | F24B 15/005 |
| | | | | 126/41 R |
| 5,425,352 A * | 6/1995 | Gillam | | A47J 37/0763 |
| | | | | 99/450 |
| 5,687,704 A * | 11/1997 | Lerch | | A47J 37/0763 |
| | | | | 99/450 |
| 5,797,386 A * | 8/1998 | Orr | | A47J 37/0763 |
| | | | | 126/25 R |
| 5,809,988 A * | 9/1998 | Wagner | | A47J 37/0731 |
| | | | | 126/25 R |
| 6,314,955 B1 * | 11/2001 | Boetcker | | A47J 36/2477 |
| | | | | 126/38 |
| 6,981,497 B2 * | 1/2006 | DeMars | | A47J 37/0704 |
| | | | | 126/41 R |
| 9,237,828 B2 * | 1/2016 | Walters | | A47J 37/0759 |
| 9,677,724 B2 * | 6/2017 | McClean | | F21L 26/00 |
| 9,844,299 B1 * | 12/2017 | Rodriguez | | A47J 37/042 |
| 10,299,626 B2 * | 5/2019 | Walters | | A47J 37/0759 |
| 10,806,299 B2 * | 10/2020 | Yan | | F24B 1/022 |
| 2003/0075166 A1 | 4/2003 | Glass | | F24B 1/181 |
| | | | | 126/506 |
| 2004/0123857 A1 * | 7/2004 | Viraldo | | F24B 1/202 |
| | | | | 126/50 |
| 2007/0137634 A1 * | 6/2007 | Traeger | | A47J 37/0704 |
| | | | | 126/29 |
| 2007/0227523 A1 * | 10/2007 | Huggins | | F24C 5/02 |
| | | | | 126/25 R |
| 2009/0165772 A1 * | 7/2009 | Hunt | | A47J 36/2477 |
| | | | | 126/26 |
| 2009/0199839 A1 * | 8/2009 | Hulsey | | A47J 37/07 |
| | | | | 126/25 A |
| 2011/0283990 A1 * | 11/2011 | Walters | | A47J 37/0704 |
| | | | | 126/25 B |
| 2012/0017884 A1 * | 1/2012 | Van Den Hoff | | A47J 36/26 |
| | | | | 126/25 R |
| 2012/0060819 A1 * | 3/2012 | Hunt | | A47J 36/2477 |
| | | | | 220/573.1 |
| 2014/0026881 A1 * | 1/2014 | Abrams | | A47J 37/0658 |
| | | | | 126/25 R |
| 2015/0068512 A1 * | 3/2015 | Mehler | | A47J 37/0694 |
| | | | | 126/305 |
| 2015/0136112 A1 * | 5/2015 | Dyson | | A47J 37/0704 |
| | | | | 126/25 R |
| 2015/0182075 A1 * | 7/2015 | Necsuliu | | A47J 37/0704 |
| | | | | 126/25 R |
| 2015/0345797 A1 * | 12/2015 | Lehet | | F23B 10/02 |
| | | | | 126/77 |
| 2016/0051087 A1 * | 2/2016 | Nguyen | | A47J 37/07 |
| | | | | 99/445 |
| 2017/0303741 A1 * | 10/2017 | Horne, III | | A47J 37/0763 |
| 2018/0149366 A1 * | 5/2018 | Schneider | | F24B 1/1915 |
| 2022/0090791 A1 * | 3/2022 | Hwang | | F24B 3/00 |
| 2023/0099933 A1 * | 3/2023 | Weilert | | F24B 1/22 |
| | | | | 126/25 R |

FOREIGN PATENT DOCUMENTS

| | | | | |
|---|---|---|---|---|
| GB | 2461402 A | * | 1/2010 | |
| KR | 200391747 Y1 | * | 5/2005 | |
| KR | 200438326 Y1 | * | 11/2006 | |
| KR | 20200122766 A | * | 4/2019 | |
| PH | 22012000453 U1 | * | 8/2012 | |
| WO | WO-2010063992 A1 | * | 6/2010 | ......... A47J 37/0658 |
| WO | WO-2013156841 A1 | * | 10/2013 | ............. A47J 33/00 |

* cited by examiner

STOVE WITH ASH COLLECTING DRAWER

CROSS-REFERENCE TO RELATED APPLICATIONS

The application claims priority of Chinese patent application 2023202049604, filed on 2023 Jan. 19, which is incorporated herein by reference in its entireties.

TECHNICAL FIELD

The present disclosure relates to the field of stoves, in particular to a stove with an ash collecting drawer.

BACKGROUND

Most of the existing stove products are integrally designed. The disadvantage is that after firewood is burned into ashes, the only way to dump ashes is to move the whole stove to a place where the ashes can be dumped, so that it is inconvenient to use. If the stove itself is heavy, it will be time-consuming and laborious to dump garbage. Moreover, because the current stove products are integrated, it is not convenient for users to store and carry, which greatly affects the user experience. Therefore, there is an urgent need to provide a stove which is convenient for users to dump ashes and to store and carry, so as to improve the user experience.

SUMMARY

In order to overcome the shortcomings of the prior art, the present disclosure provides a stove with an ash collecting drawer, which is convenient for users to dump ashes and to store and carry, so as to improve the user experience.

The technical solution adopted by the present disclosure to solve the technical problem is as follows:

The present disclosure provides a stove with an ash collecting drawer,
 including a stove body, a base and an ash collecting drawer, wherein the stove body is detachably connected with the base; a baking tray is provided on the stove body, the stove body is provided with a first accommodating cavity, the first accommodating cavity is provided with a first accommodating opening, the ash collecting drawer is placed in the first accommodating cavity through the first accommodating opening; the base is provided with a second accommodating cavity, the second accommodating cavity is provided with a second accommodating opening, and when the stove body is detached from the base, the stove body is placed in the second accommodating cavity through the second accommodating opening.

As the improvement of the present disclosure, the baking tray is provided with a baking part and a first handle, and the first handle is rotatably connected with the baking part.

As the improvement of the present disclosure, the ash collecting drawer is provided with an ash collecting cavity and a supporting part, the supporting part is provided above the ash collecting cavity, and the supporting part is used to support firewood.

As the improvement of the present disclosure, the ash collecting cavity is further provided with a hook.

As the improvement of the present disclosure, the ash collecting drawer is provided with a second handle.

As the improvement of the present disclosure, the number of the second accommodating openings is two, and the two second accommodating openings are provided on both sides of the base, respectively.

As the improvement of the present disclosure, the stove body is further provided with a plurality of ventilation openings, and the plurality of ventilation openings are uniformly arranged around the circumference of the side wall of the stove body.

As the improvement of the present disclosure, the baking tray is further provided with a first sleeve opening, the upper side of the stove body is sleeved on the first sleeve opening; the lower side of the stove body is provided with a second sleeve opening, the base is provided with a connecting boss, and the connecting boss is sleeved on the second sleeve opening.

As the improvement of the present disclosure, the supporting part is a grid-like supporting part.

As the improvement of the present disclosure, the baking part is a grid-like baking part.

As the improvement of the present disclosure, a stove with an ash collecting drawer, further including a stove body, a base and an ash collecting drawer, wherein the stove body is detachably connected with the base; a baking tray is provided on the stove body, the stove body is provided with a first accommodating cavity, the first accommodating cavity is provided with a first accommodating opening, the ash collecting drawer is placed in the first accommodating cavity through the first accommodating opening; the base is provided with a second accommodating cavity, the second accommodating cavity is provided with a second accommodating opening, the stove body is placed in the second accommodating cavity through the second accommodating opening.

Beneficial effects: a stove with an ash collecting drawer is detachably connected with the base because the stove includes the stove body, the base and the ash collecting drawer. A baking tray is provided on the stove body. The stove body is provided with a first accommodating cavity. The first accommodating cavity is provided with a first accommodating opening. The ash collecting drawer is placed in the first accommodating cavity through the first accommodating opening. The base is provided with a second accommodating cavity. The second accommodating cavity is provided with a second accommodating opening. When the stove body is detached from the base, the stove body is placed in the second accommodating cavity through the second accommodating opening, so that firewood can be burned in the first accommodating cavity, and the ashes generated after combustion fall into the ash collecting drawer. After the ashes in the ash collecting drawer are full, the ash collecting drawer can be drawn out of the stove body, so that the ashes in the ash collecting drawer can be dumped into a trash can, and the dumping of the ashes can be easily completed, thus saving both time and labor. Moreover, when the stove body is used to bake food, the second accommodating cavity on the base can be used to accommodate firewood, so that users can add firewood into the stove body in time. Further, because the stove body is detachably connected with the base, when the user finishes using the stove, the stove body can be detached from the base, and the stove body is placed in the second accommodating cavity through the second accommodating opening, which is convenient for users to store and carry the stove.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
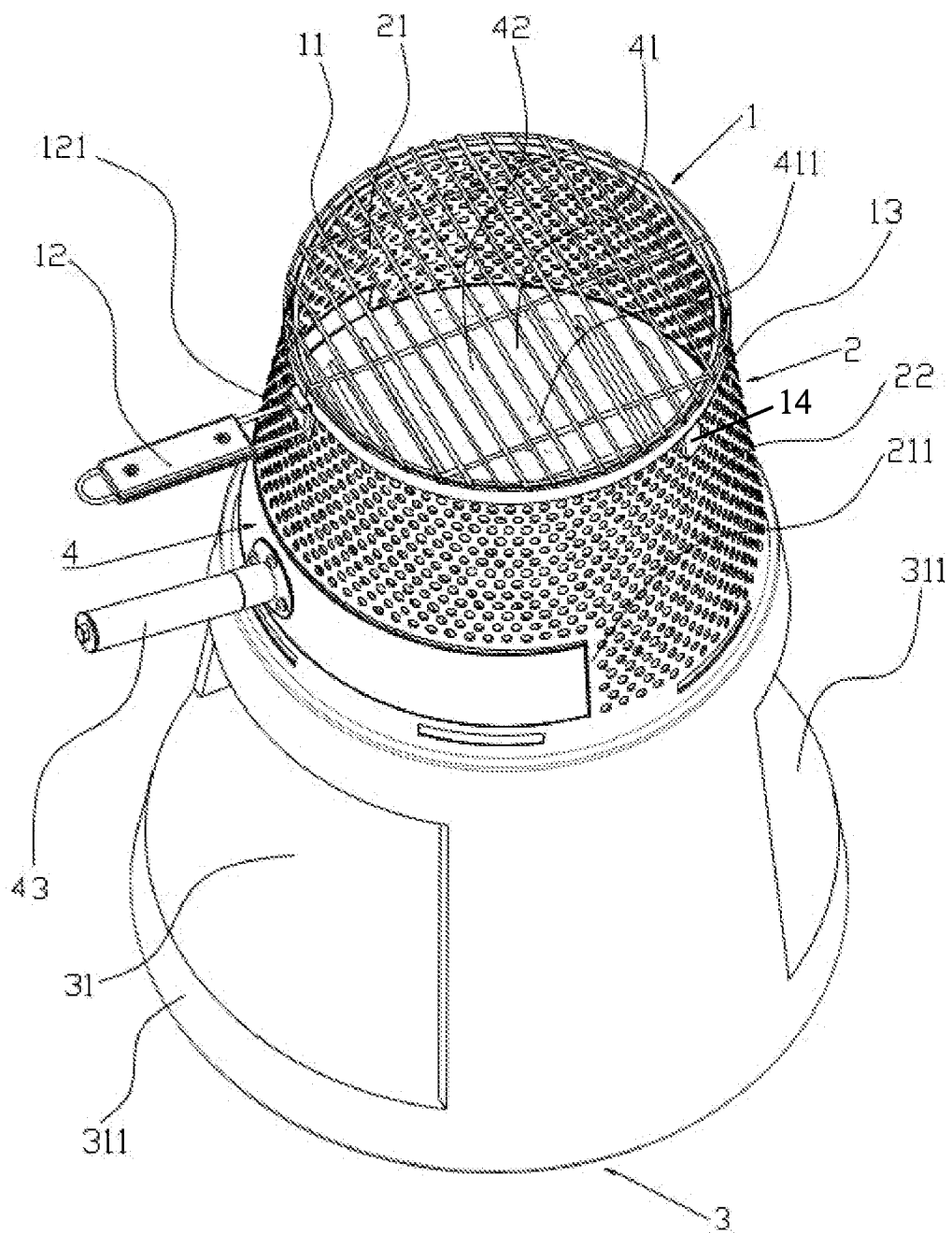
FIG. 1 is a schematic diagram of the overall structure of the present disclosure.
Figure 2:
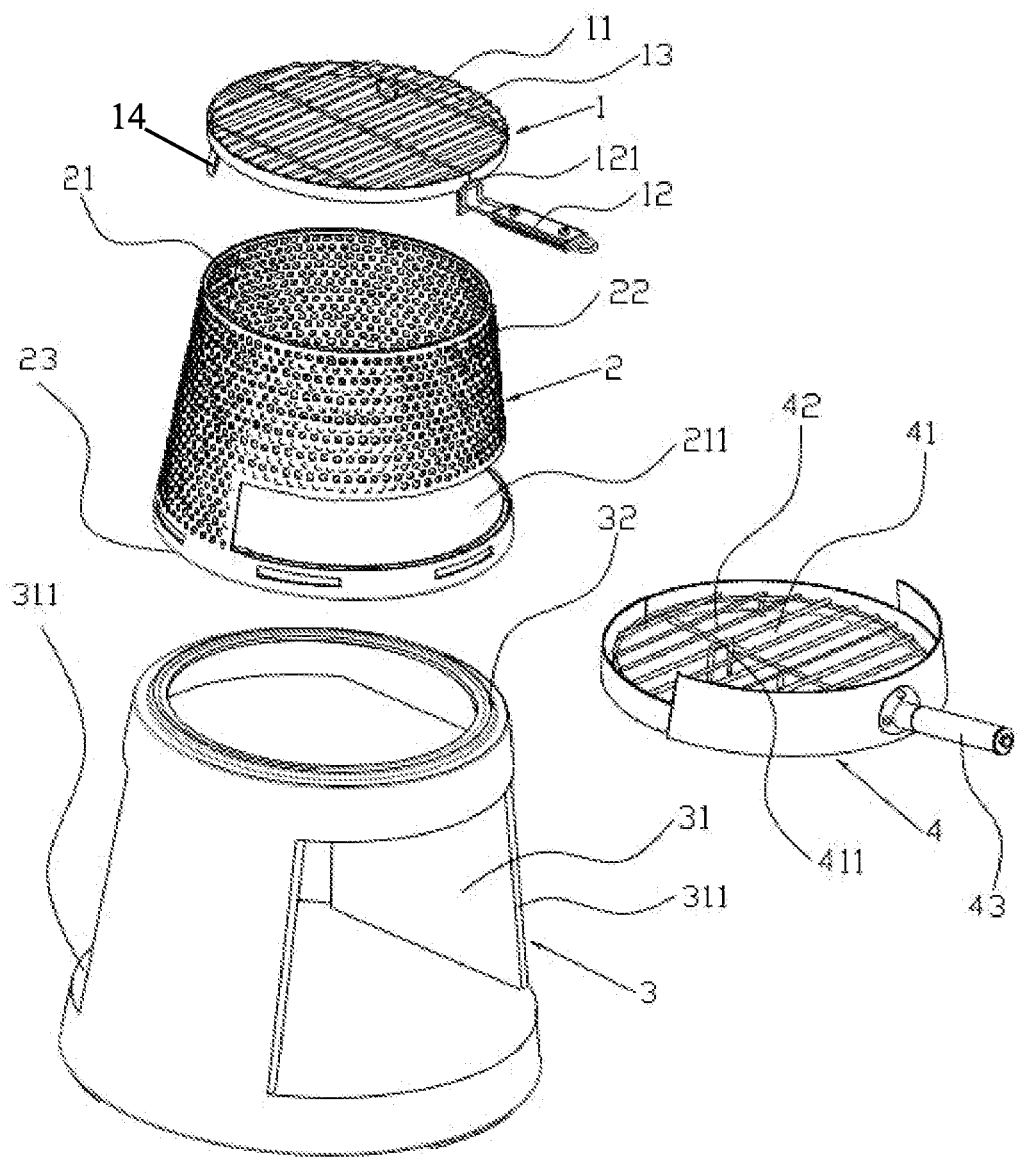
FIG. 2 is an explosive view of the present disclosure.
Figure 3:
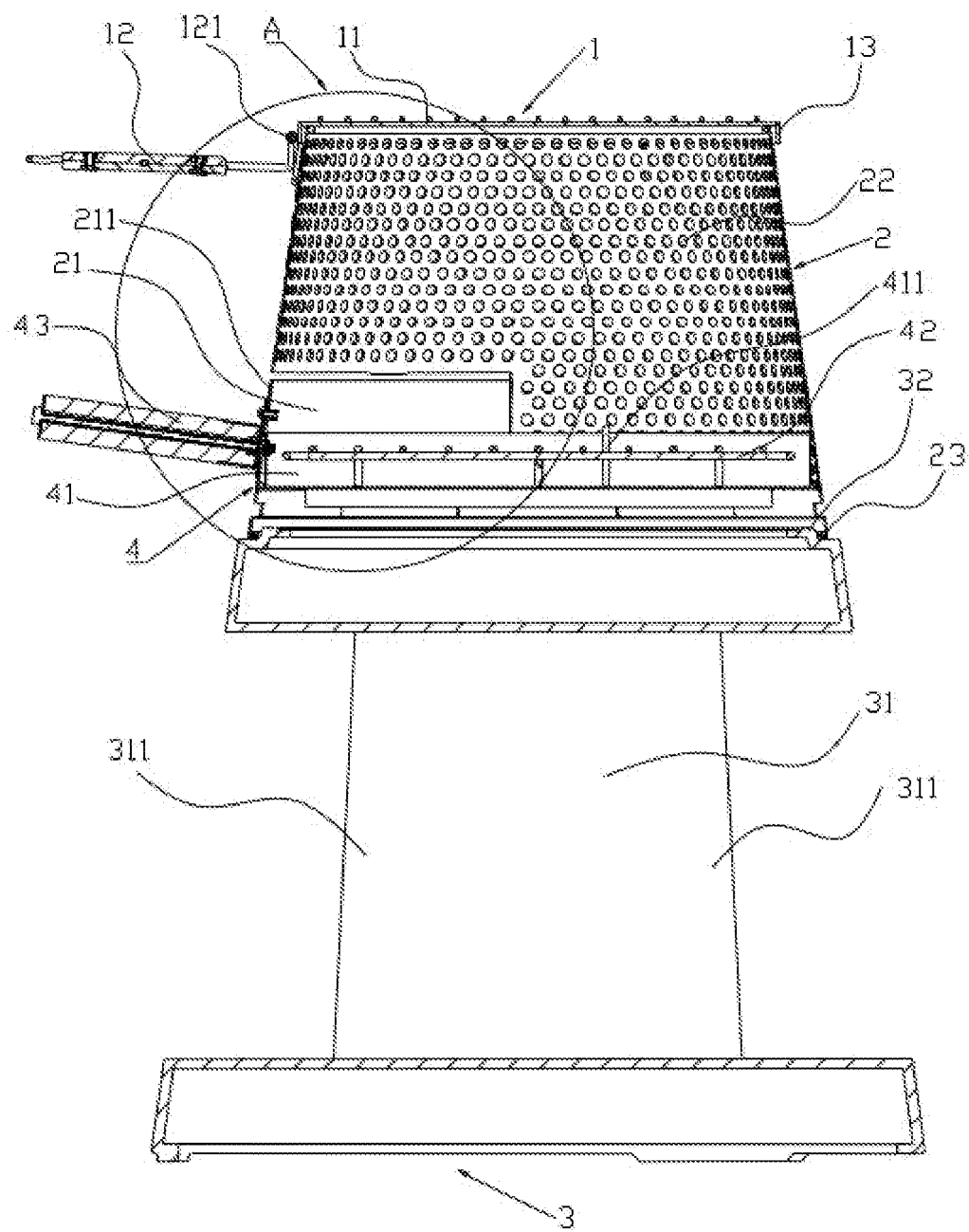
FIG. 3 is a cross-sectional view taken along a baking tray, a stove body, a base and an ash collecting drawer.
Figure 4:
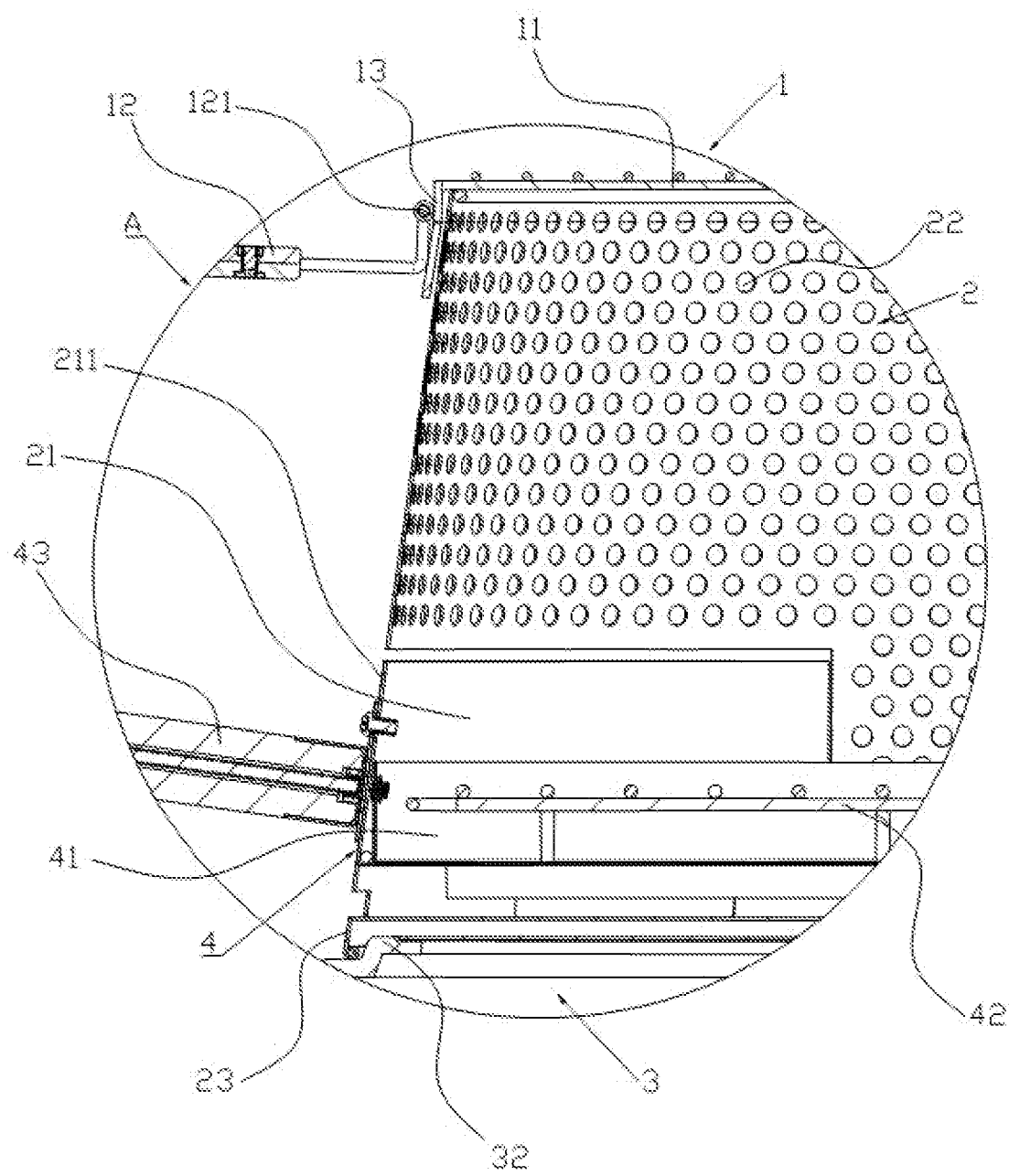
FIG. 4 is an enlarged view at A of FIG. 3.

Referring to FIGS. 1 to 4, a stove with an ash collecting drawer includes a stove body 2, a base 3 and an ash collecting drawer 4. The stove body 2 is detachably connected with the base 3. A baking tray 1 is provided on the stove body 2 and includes fixing parts 14 that are configured to abut an outer surface of stove body 2. The stove body 2 is provided with a first accommodating cavity 21. The first accommodating cavity 21 is provided with a first accommodating opening 211. The ash collecting drawer 4 is placed in the first accommodating cavity 21 through the first accommodating opening 211. The base 3 is provided with a second accommodating cavity 31. The second accommodating cavity 31 is provided with a second accommodating opening 311. When the stove body 2 is detached from the base 3, the stove body 2 is placed in the second accommodating cavity 31 through the second accommodating opening 311. With the above structure, the stove body is detachably connected with the base because the stove includes the stove body, the base and the ash collecting drawer. A baking tray is provided on the stove body. The stove body is provided with a first accommodating cavity. The first accommodating cavity is provided with a first accommodating opening. The ash collecting drawer is placed in the first accommodating cavity through the first accommodating opening. The base is provided with a second accommodating cavity. The second accommodating cavity is provided with a second accommodating opening. When the stove body is detached from the base, the stove body is placed in the second accommodating cavity through the second accommodating opening, so that firewood can be burned in the first accommodating cavity, and the ashes generated after combustion fall into the ash collecting drawer. After the ashes in the ash collecting drawer are full, the ash collecting drawer can be drawn out of the stove body, so that the ashes in the ash collecting drawer can be dumped into a trash can, and the dumping of the ashes can be easily completed, thus saving both time and labor. Moreover, when the stove body is used to bake food, the second accommodating cavity on the base can be used to accommodate firewood, so that users can add firewood into the stove body in time. Further, because the stove body is detachably connected with the base, when the user finishes using the stove, the stove body can be detached from the base, and the stove body is placed in the second accommodating cavity through the second accommodating opening, which is convenient for users to store and carry the stove.

In this embodiment, the baking tray 1 is provided with a baking part 11 and a first handle 12, and the first handle 12 is rotatably connected with the baking part 11. The baking part 11 is a grid-like baking part. Specifically, the first handle is rotatably connected with the baking part through the rotating shaft 121. With the above structure, users can rotate the first handle to the unfolded position or the folded position. When users need to use the baking tray, the first handle can be rotated to the unfolded position, so that the users can move the baking tray through the first handle. After the use of the baking tray, the first handle can be turned to the folding position, which is convenient for users to fold and store the baking tray. In addition, the grid-like baking part can fully and uniformly transfer the heat generated by combustion of firewood to the food placed on the baking part, so as to improve the baking efficiency of the stove.

In this embodiment, the ash collecting drawer 4 is provided with an ash collecting cavity 41 and a supporting part 42. The supporting part 42 is provided above the ash collecting cavity 41, and the supporting part 42 is used to support firewood. The ash collecting cavity 41 is further provided with a hook 411. Specifically, the ash collecting drawer 4 is provided with a second handle 43. Further, the supporting part 42 is a grid-like supporting part. With the above structure, firewood can be placed on the supporting part for combustion, and the ashes generated after combustion of firewood can fall into the ash collecting cavity through the grid. After the ashes in the ash collecting cavity are full, users can draw the ash collecting drawer out of the first accommodating cavity through the second handle, so that users can dump the ashes in the ash collecting drawer into a trash can. In addition, the ash collecting drawer can be hung on an object such as the external wall through the hook in the ash collecting cavity, which is further convenient for users to dump the ashes in the ash collecting drawer into the trash can.

In this embodiment, the number of the second accommodating openings 311 is two, and the two second accommodating openings 311 are provided on both sides of the base 1, respectively. With the above structure, users can put firewood into the second accommodating cavity for storage through the second accommodating openings provided on both sides of the base, which is not only convenient for users to add firewood into the stove body, but also prevents the firewood from being scattered on the ground, thus preventing users from tripping over firewood. Further, after the use of the stove, the stove body can be detached from the base, and the stove body can be placed in the accommodating cavity through the second accommodating openings provided on both sides of the base, so that the volume of the stove is reduced, and it is convenient for users to store and carry.

In this embodiment, the stove body 2 is further provided with a plurality of ventilation openings 22, and the plurality of ventilation openings 22 are uniformly arranged around the circumference of the side wall of the stove body 2. With the above structure, air can enter the first accommodating cavity through the ventilation openings provided on the side wall of the stove body, so that firewood can be fully burned to improve the combustion efficiency of firewood.

In this embodiment, the baking tray 1 is further provided with a first sleeve opening 13. The upper side of the stove body 2 is sleeved on the first sleeve opening 13. The lower side of the stove body 2 is provided with a second sleeve opening 23. The base 3 is provided with a connecting boss 32, and the connecting boss 32 is sleeved on the second sleeve opening 23.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A stove with an ash collecting drawer, comprising a stove body, a base and Drill the ash collecting drawer, wherein the stove body is detachably connected with the base; a baking tray is provided on the stove body, the stove body is provided with a first accommodating cavity, the first accommodating cavity is provided with a first accommodating opening, the ash collecting drawer is placed in the first accommodating cavity through the first accommodating opening; the base is provided with a second accommodating cavity and two second accommodating openings, each second accommodating opening communicating with the second accommodating cavity, the two second accommodating openings located at two opposite side of the base, and when the stove body is detached from the base, the stove body is able to be placed in the second accommodating cavity through one of the second accommodating openings.

2. The stove with an ash collecting drawer according to claim 1, wherein the baking tray is provided with a baking part and a first handle, and the first handle is rotatably connected with the baking part.

3. The stove with an ash collecting drawer according to claim 2, wherein the baking part is a grid-like baking part.

4. The stove with an ash collecting drawer according to claim 2, wherein a plurality of fixing parts are connected to the baking part and are configured to abut an outer surface of the stove body.

5. The stove with an ash collecting drawer according to claim 1, wherein the ash collecting drawer comprises a main drawer with an ash collecting cavity and a supporting part provided above the ash collecting cavity, the supporting part is used to support firewood and comprises a plurality of supporting rods connected a side plate of the main drawer, an U-shaped hook is disposed in the ash collecting cavity, two ends the U-shaped hook are connected a bottom plate of the main drawer, and the U-shaped hook protrudes out from a gap between two adjacent supporting rods of the plurality of supporting rods.

6. The stove with an ash collecting drawer according to claim 1, wherein the ash collecting drawer is provided with a second handle connected a first part of the side plate of the main drawer, a second part of the side plate of the main drawer faces the first part of the side plate of main drawer, and a height of the first part of the side plate of the main drawer is less than a height of the second part of the side plate of the main drawer.

7. The stove with an ash collecting drawer according to claim 1, wherein the stove body is further provided with a plurality of ventilation openings, and the plurality of ventilation openings are uniformly arranged around a side wall of the stove body.

8. The stove with an ash collecting drawer according to claim 1, wherein the baking tray is further provided with a first sleeve opening, an upper side of the stove body is configured to be sleeved on the first sleeve opening such that the baking tray is disposed on the upper side of the stove body; a lower side of the stove body is provided with a second sleeve opening, the base is provided with a connecting boss located at an upper side of the base, and the connecting boss is configured to be sleeved on the second sleeve opening such that the stove body is disposed on the upper side of the base.

9. The stove with an ash collecting drawer according to claim 1, wherein when the stove body is placed in the second accommodating cavity through one of the second accommodating openings, the first accommodating opening and one of the second accommodating openings are located at the same side of the stove.

10. A stove with an ash collecting drawer, comprising a stove body, a base and DIM the ash collecting drawer, wherein the stove body is detachably connected with an upper side of the base; a baking tray is provided on the stove body, the stove body is provided with a first accommodating cavity, the first accommodating cavity is provided with a first accommodating opening, the ash collecting drawer is placed in the first accommodating cavity through the first accommodating opening; the base is provided with a second accommodating cavity and two second accommodating openings, each second accommodating opening communicating with the second accommodating cavity, the two second accommodating openings located at two opposite sides of the base, the stove body is able to be placed in the second accommodating cavity through one of the second accommodating openings when the stove body is detached from the base.

11. The stove with an ash collecting drawer according to claim 10, wherein the baking tray is provided with a baking part and a first handle, and the first handle is rotatably connected with the baking part.

12. The stove with an ash collecting drawer according to claim 11, wherein the baking part is a grid-like baking part.

13. The stove with an ash collecting drawer according to claim 11, wherein a plurality of fixing parts are connected to the baking part and are configured to abut an outer surface of the stove body.

14. The stove with an ash collecting drawer according to claim 10, wherein the ash collecting drawer comprises a main drawer with an ash collecting cavity and a supporting part provided above the ash collecting cavity, the supporting part is used to support firewood and comprises a plurality of supporting rods connected a side plate of the main drawer, an U-shaped hook is disposed in the ash collecting cavity, two ends the U-shaped hook are connected a bottom plate of the main drawer, and the U-shaped hook protrudes out from a gap between two adjacent supporting rods of the plurality of supporting rods.

15. The stove with an ash collecting drawer according to claim 10, wherein the ash collecting drawer is provided with a second handle connected a first part of the side plate of the main drawer, a second part of the side plate of the main drawer faces the first part of the side plate of main drawer, and a height of the first part of the side plate of the main drawer is less than a height of the second part of the side plate of the main drawer.

16. The stove with an ash collecting drawer according to claim 10, wherein the stove body is further provided with a plurality of ventilation openings, and the plurality of ventilation openings are uniformly arranged around a side wall of the stove body.

17. The stove with an ash collecting drawer according to claim 10, wherein the baking tray is further provided with a first sleeve opening, an upper side of the stove body is configured to be sleeved on the first sleeve opening such that the baking tray is disposed on the upper side of the stove body; a lower side of the stove body is provided with a second sleeve opening, the base is provided with a connecting boss located at the upper side of the base, and the connecting boss is sleeved on the second sleeve opening such that the stove body is disposed on the upper side of the base.

18. The stove with an ash collecting drawer according to claim 10, wherein when the stove body is placed in the second accommodating cavity through one of the second accommodating openings, the first accommodating opening and one of the second accommodating openings are located at the same side of the stove.

\* \* \* \* \*